Sept. 7, 1943.  I. E. BORCHERS  2,328,607
MACHINE FOR REMOVING HUSKS AND SILKS FROM CORN
Filed Sept. 27, 1940  3 Sheets-Sheet 1

Inventor.
Irvin E. Borchers,
by Parker & Carter
Attorneys.

Inventor.
Irvin E. Borchers,
by Parker & Carter
Attorneys.

Sept. 7, 1943.    I. E. BORCHERS    2,328,607
MACHINE FOR REMOVING HUSKS AND SILKS FROM CORN
Filed Sept. 27, 1940    3 Sheets-Sheet 3
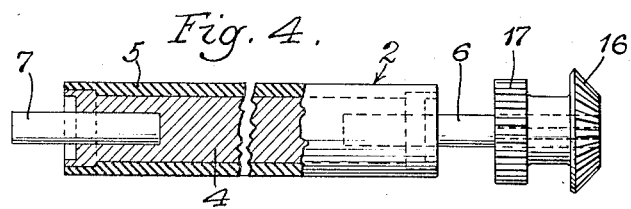
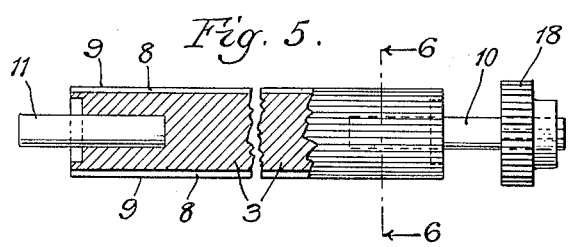
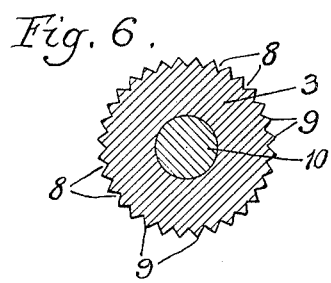
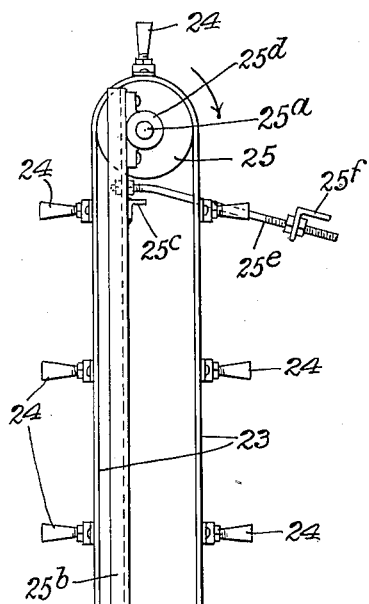
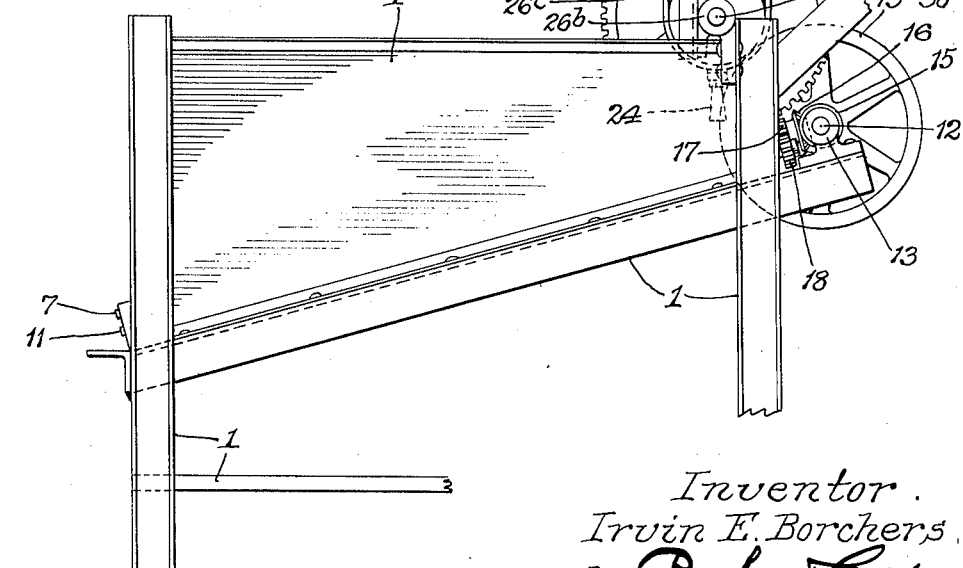
Inventor.
Irvin E. Borchers,
by Parker Carter
Attorneys.

Patented Sept. 7, 1943

2,328,607

UNITED STATES PATENT OFFICE 2,328,607

MACHINE FOR REMOVING HUSKS AND SILKS FROM CORN

Irvin E. Borchers, La Fayette, Ind., assignor to De Kalb Agricultural Association, Inc., De Kalb, Ill., a corporation of Delaware Application September 27, 1940, Serial No. 358,597

2 Claims. (Cl. 130—5)

This invention relates to machines for removing husks and silks from corn and has for its object to provide a new and improved device of this description.

The invention is particularly adapted for use in connection with hybrid seed corn. At the present time this hybrid corn is shucked in the field and brought to picking tables. A number of men are located around each of these picking tables. These men must pick up each ear of corn separately and remove whatever portions of husks and silks that have been left on the corn. One of the objects of the present invention is to provide a machine which will do this work, each machine doing the work of a large number of men and doing it faster and better. The invention has as a further object to provide a machine for removing husks and silks from corn having means for moving the ears of corn through the machine and means for retarding the movement of the corn therethrough. The invention has as a further object to provide a machine for removing husks and silks from corn having two cooperating sections between which the corn is placed, one of said sections having rotating members which rotate substantially at right angles to the movement of the corn through the machine. The invention has as a further object to provide a machine for removing husks and silks from corn comprising alternate rubber and metal cleaning rolls along which the corn is moved.

The invention has further objects which are more particularly pointed out in the accompanying description.

Referring now to the drawings,

Fig. 3 is a view of the device shown in Fig. 1 with the belt with the projections thereon moved out of the way;

Fig. 4 is a view in part section of one of the rubber rolls;

Fig. 5 is a view in part section of one of the metal rolls;

Fig. 6 is a sectional view taken on line 6—6 of Fig. 5;

Like numerals refer to like parts throughout the several figures.

Figure 1:
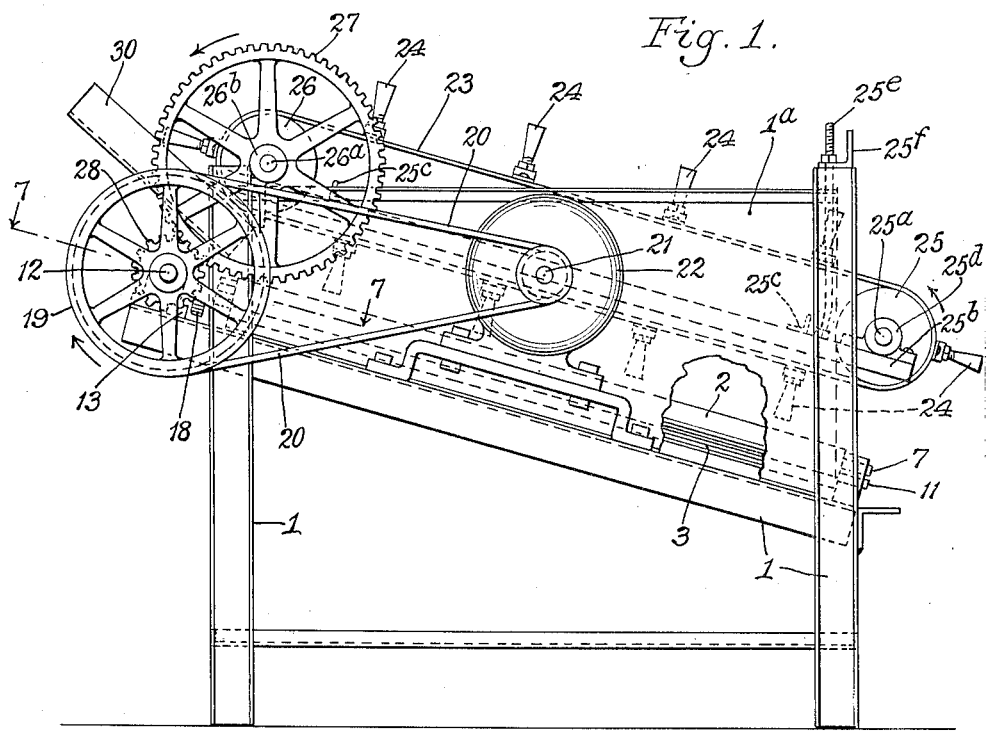
Fig. 1 is a side view of one form of device embodying the invention.
Figure 7:
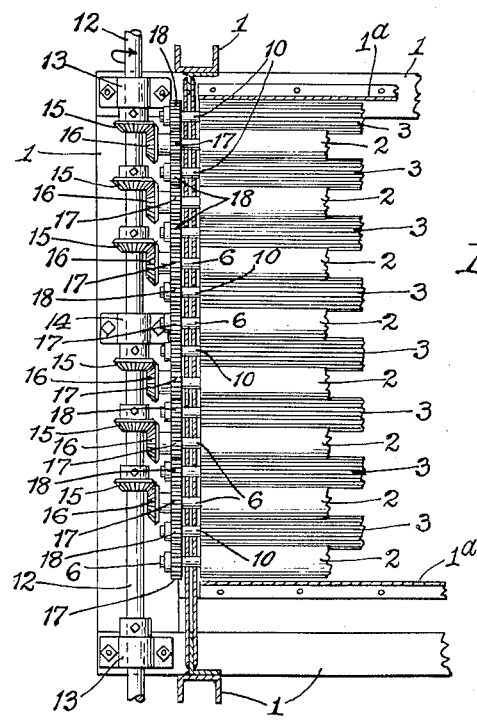
Fig. 7 is a sectional view taken on line 7—7 of Fig. 1.
Figure 2:
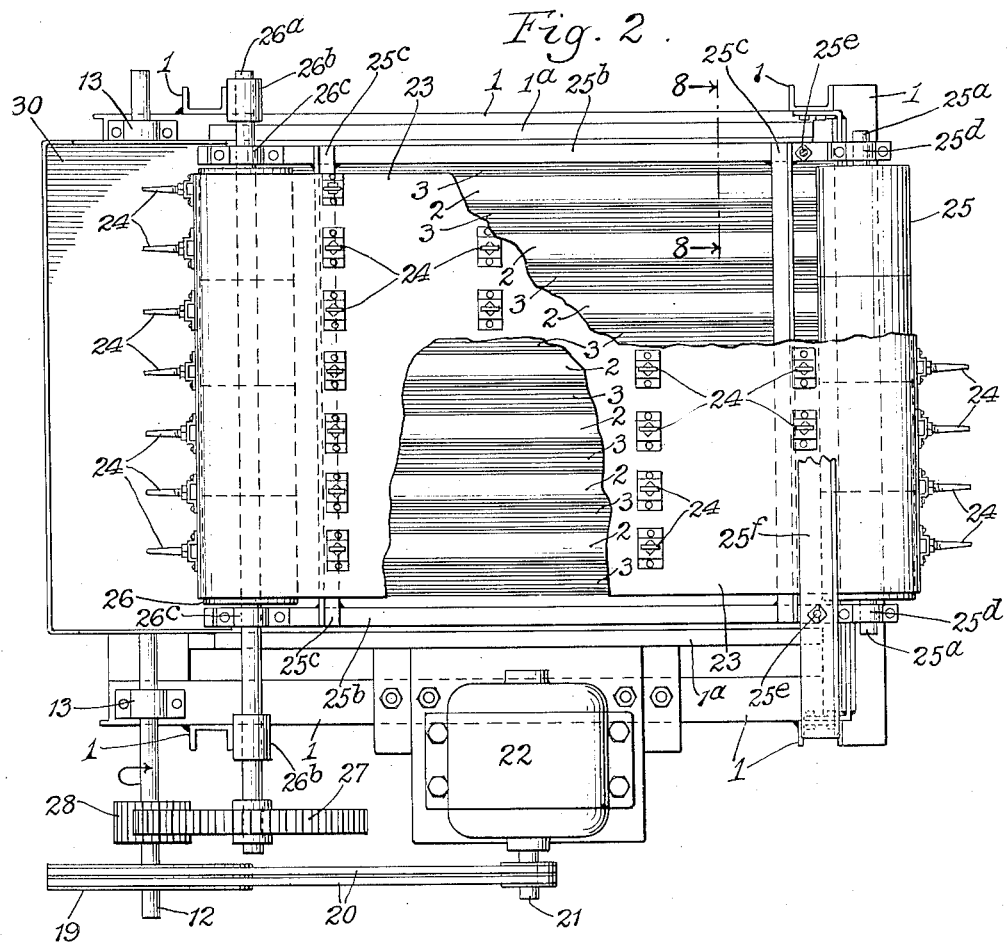
Fig. 2 is a plan view of the device shown in Fig. 1.
Figure 8:
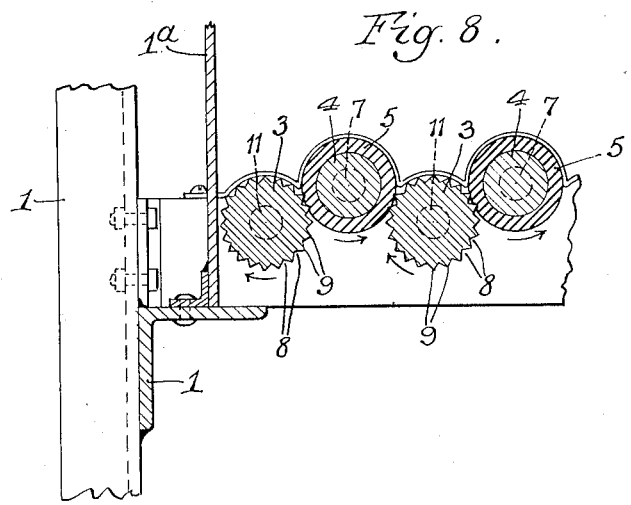
Fig. 8 is a sectional view taken on line 8—8 of Fig. 2.

Referring now to the drawings, in the particular construction shown there is a suitable frame 1. Rotatably mounted on this frame are a series of cleaning rolls which consist of a series of rubber rolls 2 and a series of intermediate metal rolls 3, preferably of steel.

The rubber rolls may be made in any desired manner. As herein shown, these rubber rolls consist of a central core 4. Around this central core is a rubber covering 5 which is attached to the metal core in any desired manner, so as to rotate therewith. The central core is provided at one end with the metal member 6 and at the other end with the metal member 7 of smaller diameter than the core. These members extend into openings in the end of the metal core and are fastened rigidly to the core so that the core rotates therewith and act as the supporting members for supporting the roll in its operative position.

The metal rolls 3, see Figs. 5 and 6, are provided with longitudinally extending grooves 8 and projections 9. These rolls preferably are of steel and are provided at their ends with the metal members 10 and 11 which project into openings in the ends of the rolls and which are fastened rigidly thereto so that the rolls rotate therewith. These members act as the supports for the rolls.

The rolls are mounted in the frame in an inclined position, with the metal rolls intermediate the rubber rolls, the rubber rolls projecting up higher than the metal rolls so as to provide corn receiving grooves between the rubber rolls. The rolls are inclined downwardly from the point where the corn enters the machine toward the point where it is discharged therefrom. The rubber rolls are tightly crowded or pressed against the metal rolls so that the rubber rolls at the point of engagement with the metal rolls, are under compression. This result is secured in any desired manner. As herein shown this result is secured by mounting the rolls so that the axes of the adjacent metal and rubber rolls are closer together than the summation of the external diameters of two adjacent rubber and metal rolls. This crowds or presses the rubber into the grooves between the projections on the metal rolls and insures the proper engagement of the rubber and metal rolls with the husks and silks so as to remove them from the ears of corn.

The cleaning rolls are rotated in any desired manner. As herein shown, there is a driving shaft 12 which extends across the machine and which is mounted in suitable end bearings 13 and an intermediate bearing 14. In the particular construction shown the rubber rolls are driven directly from the driving shaft 12 and the metal or steel rolls are driven from the rubber rolls. The shaft 12, for example, is provided with beveled gears 15 which engage beveled gears 16 on the rubber rolls so that the rubber rolls are driven. The rubber rolls are also provided with driving gears 17 back of the beveled gears, which engage gears 18 on the steel rolls. This causes the steel rolls to rotate in the opposite direction to that of the rubber rolls. It is of course evident that the rolls may be driven in any other desired manner. The driving shaft 12 is driven in any desired manner. As herein shown, it is provided with a driving pulley 19 which is driven by a belt 20 attached to the shaft 21 of a driving motor 22.

The supporting frame may be made in any desired manner. On each side of the cleaning rolls there are preferably provided side members 1a which prevent the corn from being discharged laterally from the machine and which with the cleaning rolls form a channel through which the corn is moved.

Located above the cleaning rolls is a belt 23 which is provided with a series of projections 24. This belt moves in a direction at right angles to the direction of the cleaning rolls. As illustrated, this belt is mounted upon two rolls 25 and 26, which are provided with shafts 25a and 26a. The shaft 26a is mounted in bearings 26b supported on the frame. There is a frame consisting of the longitudinal members 25b and the cross members 25c. The shaft of the roll 25 is mounted in bearings 25d attached to this frame. The other end of the frame is supported on the shaft 26a by the brackets 26c. When the machine is in operation the belt 23 and associated parts are in the position shown in Fig. 1. The belt and frame are pivotally mounted on the shaft 26a by the brackets 26c so that the belt may be moved up into the position shown in Fig. 3 to secure access to the cleaning rolls. The roll 26 is rotated in any desired manner. As herein shown, the shaft 26a of this roll is provided with a driving gear 27 which engages a gear 28 on the shaft 12. The corn is fed to the machine by being placed in the hopper or channel 30 which guides it into the space between the belt 23 and the cleaning rolls 2 and 3. The lower face of this belt moves in a direction from the corn admission end to the corn discharge end of the machine. The projections 24 are preferably arranged above the rubber rolls so as to guide the ears of corn along the grooves between the rubber rolls, that is, along the steel rolls 3. Some means is provided for holding the belt 23 and associated parts in its proper operative position. As herein shown, there is connected to the free ends of the frame members 25b the member 25e and to these is attached the adjustable supporting member 25f, see Fig. 3. When the belt is in its operative position, the supporting member 25f rests upon the upright members of the frame 1, see Fig. 1. In order to move the belt and associated parts out of the way, it is only necessary to lift up the upright end and move the parts to the position shown in Fig. 3.

As the ears of corn pass down along the rolls 2 and 3, the rotation of these rolls causes the husk and silk portions thereon to pass between the rubber rolls and the metal rolls and to be removed from the ears and the machine, so that the ears pass out of the machine free from husks and silks. This machine therefore cleans the ears of corn satisfactorily and nothing further need be done so far as cleaning is concerned. The corn is then ready to be dried.

The use and operation of my invention are as follows.

When the parts are assembled, the ears of corn are inserted in the machine at the point where the rubber and metal rolls are the highest. The projections on the belt engage the ears of corn and insure their being arranged substantially parallel with the rubber and metal rolls and in the grooves between the rubber and metal rolls. The rotation of the rolls, which are preferably rotated in opposite directions, causes the rolls to engage the husks and silks and pull them loose from the ears of corn and discharges them beneath the rolls. When the metal rolls with the grooves are used, the rubber, by the pressure between the metal and rubber rolls, is pressed into these grooves and the rolls when rotated, apply sufficient pressure to the husks and silks to pull them away from the ears of corn and move them down out of the way and discharge them beneath the rolls. The corn is then discharged from the machine entirely free from husks and silks and is ready to be dried.

I claim:

1. A machine for removing husks and silks from corn comprising a plurality of pairs of co-operating rolls, one roll of each pair being a rubber surfaced roll and the other roll of each pair being a metal surfaced roll, the rubber surfaced rolls having substantially smooth rubber surfaces extending throughout their length, the rolls being arranged so that each alternate roll is a rubber surfaced roll, the metal surfaced rolls being provided with longitudinally extending projections and grooves on the surfaces thereof, the axes of the rubber surfaced rolls being all in the same plane and the axes of the metal surfaced rolls being all in the same plane but in a different plane from that of the axes of the rubber surfaced rolls, all of the rolls being in contact, a supporting device upon which said rolls are mounted with their axes fixed in position, the axes of the adjacent metal surfaced rolls and rubber surfaced rolls being crowded closer together than the summation of the external radii of the adjacent metal surfaced and rubber surfaced rolls to tightly crowd the rubber surfaced rolls against the metal surfaced rolls so that the rubber surfaced rolls at the area of engagement with the metal surfaced rolls are under compression and the rubber of the rubber surfaced rolls is pressed into the grooves between the projections on the metal surfaced rolls to provide an elastic engagement between the rubber surfaced rolls and the metal surfaced rolls to insure the removal of the husks and silks from the corn, driving means for driving all of the rubber surfaced rolls in the same direction and all of the metal surfaced rolls in a direction opposite to that of the rubber surfaced rolls but in the same direction with relation to each other.

2. A machine for removing husks and silks from corn comprising a plurality of rubber surfaced rolls intermediate metal surfaced rolls between the rubber surfaced rolls, the metal surfaced rolls and the rubber surfaced rolls arranged to provide longitudinal grooves between the adjacent rubber surfaced rolls along which the ears of corn travel, means for rotating all of said rubber surfaced rolls in the same direction and all of said metal surfaced rolls in the same direction, but in a direction opposite to that of the rubber surfaced rolls; the rubber surfaced rolls coacting with an adjacent metal surfaced roll on one side thereof to remove husks and silks from the corn and coacting with a metal surfaced roll on the opposite side thereof to assist in maintaining the corn in position to be acted upon by the husk and silk removing rolls, a belt located above said rolls, means for moving said belt along the rolls, a plurality of separated projections extending crosswise of said belt which are moved along said rolls, said projections being substantially at the edges of said grooves and on opposite sides of the ears of corn in said grooves so as to assist in guiding the ears of corn along said grooves.

IRVIN E. BORCHERS.